May 14, 1963  J. F. JONES  3,089,478
MITER TABLE FOR USE WITH MASONRY SAW
Filed April 17, 1961  2 Sheets-Sheet 1

Jefferson F. Jones
INVENTOR.

May 14, 1963
J. F. JONES
3,089,478
MITER TABLE FOR USE WITH MASONRY SAW
Filed April 17, 1961
2 Sheets-Sheet 2
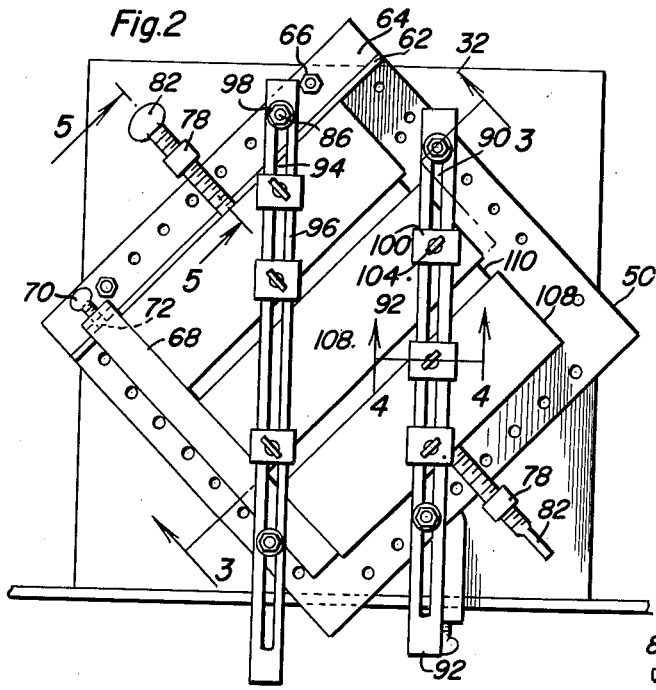
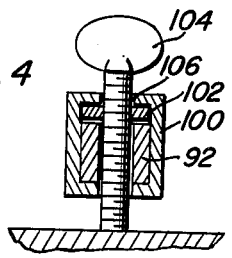
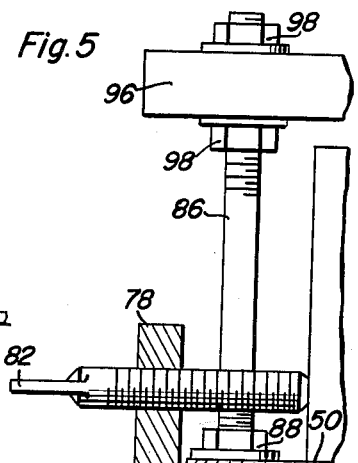
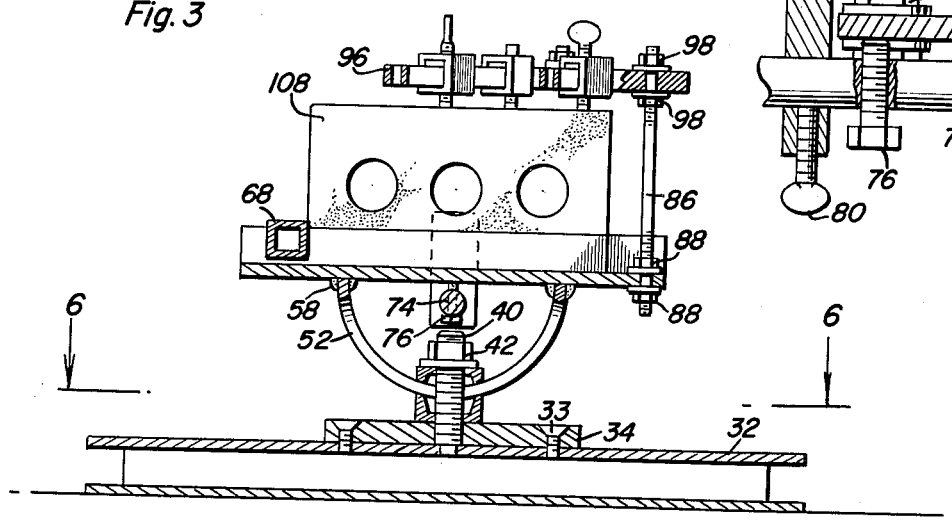
Jefferson F. Jones
INVENTOR.

3,089,478
Patented May 14, 1963

1

3,089,478
MITER TABLE FOR USE WITH MASONRY SAW
Jefferson F. Jones, P.O. Box 20142, Montclair Station,
Denver, Colo.
Filed Apr. 17, 1961, Ser. No. 103,430
4 Claims. (Cl. 125—35)

This invention relates to an adjustable supporting platform, and more particularly to a table top for supporting a workpiece which is rotatably mounted on a plurality of axes whereby the table can be moved to any desired position for permitting a compound cut in the workpiece.

It is another object of this invention to provide a supporting platform for workpieces which may be oscillated on both a vertical and a horizontal axis, and has a locking device which simultaneously locks the platform on both of its axes.

It is another object of the invention to provide a supporting table top movable on a plurality of axes which is particularly adapted to be used with masonry saws, and has versatile holddown bars thereon which are movable to numerous positions for securing various shapes and sizes of masonry to the table top.

It is still another object of the invention to provide a table for supporting masonry to be cut which has a top that can be adjusted so as to make any desired angle of cut in the masonry which it supports.

It is yet another object of the invention to provide a device for holding masonry to be cut in the exact position in which it is to be laid, thereby eliminating the layout, and effort to cut each miter singly.

It is still another object of the invention to provide a device for supporting workpieces to be cut which is simple in design, can be operated in a minimum amount of time and with a minimum amount of effort, is economical to manufacture, and durable in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a plan view of the device shown in FIGURE 1 on a different scale;

FIGURE 3 is an elevational cross sectional view taken substantially on the plane of line 3—3 in FIGURE 2;

FIGURE 4 is an enlarged elevational view taken substantially on the plane of line 4—4 in FIGURE 2;

FIGURE 5 is an enlarged elevational cross sectional view taken substantially on the plane of line 5—5 in FIGURE 2;

Figure 1:
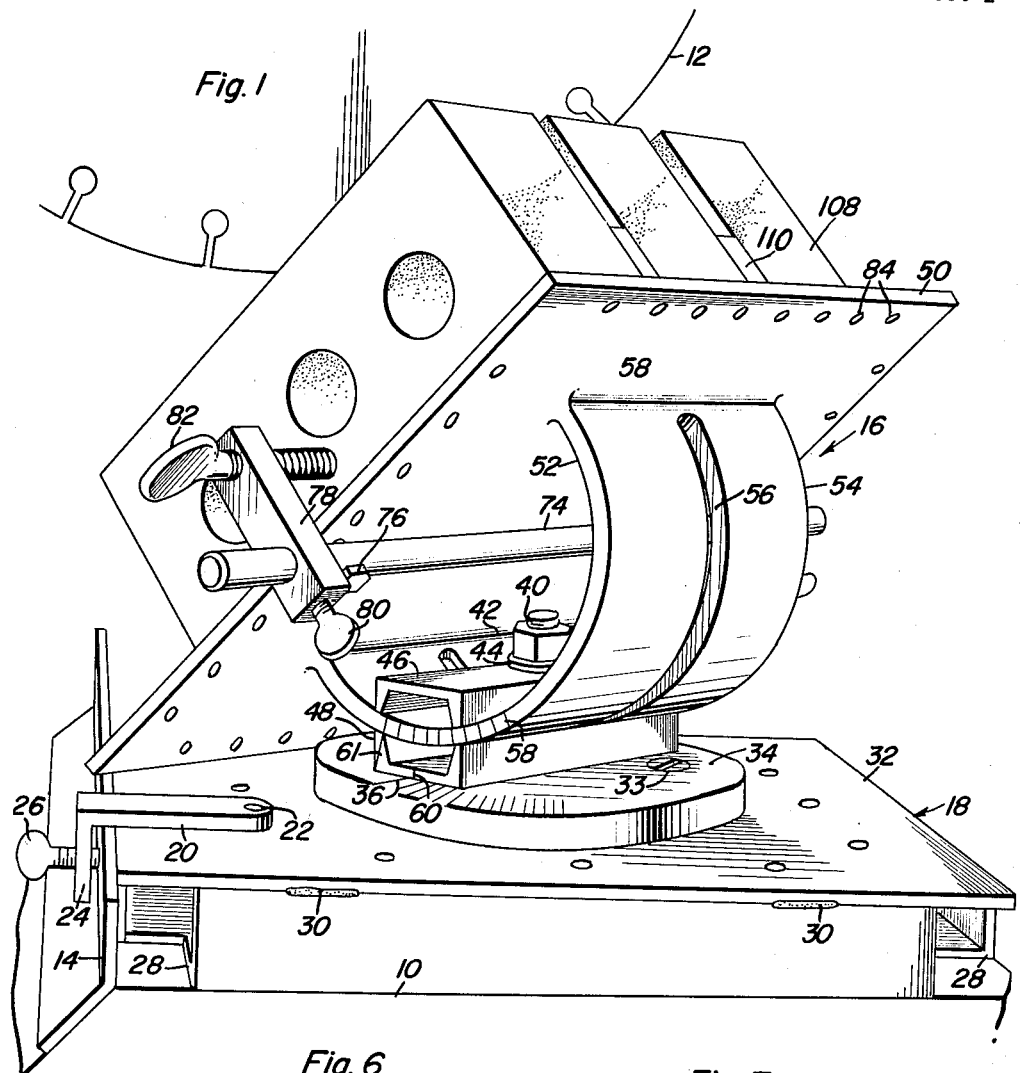
FIGURE 1 is a perspective view of the invention in use with a masonry saw.

As shown in the drawings, and particularly in FIGURE 1, a dolly cart 10 of a masonry power saw is movable in a line or direction parallel to the plane of the masonry saw blade 12. The dolly cart 10 has a vertically extending fence 14 projecting upwardly therefrom.

My adjustable miter table assembly 16 is supported on a main base 18 which has connected to its upper surface an L-shaped bracket 20 by means of a pin 22 secured to the bracket and extending into a hole in the base. A vertical leg 24 of the L-shaped bracket has a wing headed stud 26 threaded therein for locking the main base 18 to the dolly cart fence 14. As shown in FIGURE 1, the main base 18 is rectangular in shape and has an angle iron 28 secured to each of its edges by means of welds 30. The angle irons form a support for the main base plate 32 and the lower horizontal legs thereof rest upon the dolly cart 10.

Figure 6:
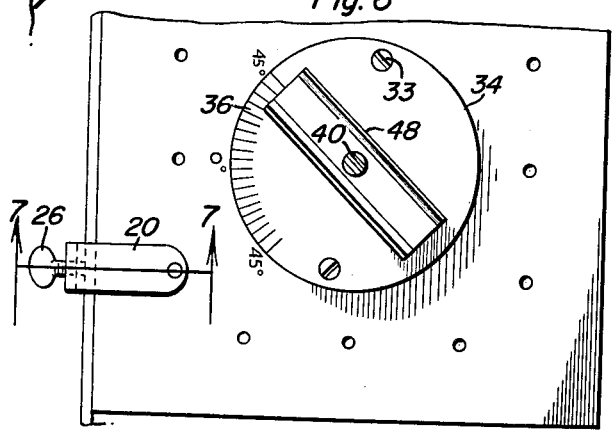
FIGURE 6 is a plan view of the structure shown in the lower part of FIGURE 1.
Figure 7:
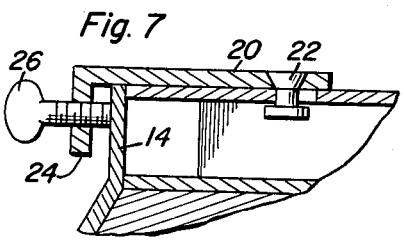
FIGURE 7 is an enlarged cross sectional elevational view taken substantially on the plane of line 7—7 in FIGURE 6.

Removably secured upon the center of the main base 18 by means of bolts 33 is a secondary base 34 which comprises a circular flat plate having indexing marks in degrees formed thereon as shown at 36 in FIGURE 6.

Fixed to the center of the secondary base 34 is a vertically extending center post 40 having threads 40 at its upper end for adjustably receiving a nut 42. Pivotally or rotatably mounted between the nut 42 and the secondary base 34 is a lock washer 44 and upper and lower channel holders 46 and 48 respectively. As shown in FIGURES 1 and 3, the channel holders 46 and 48 are U-shaped in cross section and have the free ends of their vertically extending leg portions opposing one another.

Adjustably and movably mounted above the main base 18 is the table top 50 which is formed of a relatively thick plate also rectangular in plan and preferably of a slightly smaller size than the main base 18. Secured on each side of the center of the table top 50 are two identical arcuate supports 52 and 54 which are preferably semi-cylindrical in shape and spaced apart to form a slot 56 therebetween. The arcuate supports are preferably welded to the lower surface of the table top as shown at 58'. The arcuate supports straddle the center post 40 and extend between the upper and lower channel holders 46 and 48 so that they may be adjustably locked in any desired angular position by tightening the nut 42. Angular indexing marks 58 and 61 are formed on the arcuate supports and the secondary base and lower channel member 48 for indicating the angle formed between the top 50 and the main base 32. The indicating mark 60 when used in conjunction with the indicating marks 36 indicates the angle of rotation of the table top 50 about the vertical axis of center post 40.

As shown in FIGURE 2, table top 50 has a stationary fence 62 secured along one edge thereof. The fence 62 comprises the vertically extending leg of an angle iron member, and the horizontal leg 64 thereof lies flat against the table top and is secured thereto by means of nuts and bolts 66.

An adjustable fence 68 is removably and adjustably secured to the stationary fence 62 by means of a wing headed nut 70 which is threaded into a plug or end wall in the hollow rectangular cross section of the fence 68. The fence 68 has a rectangular slot 72 formed in its lower portion which slidably receives the upper portion of the stationary fence 62. By screwing in the wing headed stud 70 until its end abuts the fence 62, the two fences are removably locked together.

A rod 74 extends across the central lower surface of the top 50 and is secured thereto by a plurality of studs 76 which extend through the rod into the lower surface of the top. A plurality of arms 78 have apertures thereing receiving the rod 74 and are adjustably locked thereon by means of wing headed studs 80 which extend axially through threaded bores in the ends of the arms 78 so as to engage the surface of the rod 74 to lock the arms and rod in the desired position. Wing headed clamping studs 82 extend through threaded bores in the upper ends of the arms 78 and are parallel to the rod 74. The arms 78 and the studs therein are identical on each end of the rod 74.

A plurality of bores 84 extend through the top 50 normal to its upper surface and are substantially evenly spaced from its edge and from each other around the periphery thereof as shown in FIGURE 1. Received in several selected bores 84 are four identical posts 86 whose lower ends extend through the bores. The posts are locked to the top 50 by means of lower clamping nuts 88 which preferably have washers adjacent their clamping surfaces. Two of the posts 86 extend through a slot 90 in a rectangular holddown bar 92, and the other two posts extend through a slot 94 in a holddown bar 96. The posts 86 support the holddown bars 92 and 96 spaced from and parallel to the upper surface of the table top 50 by means of upper clamping nuts 98.

As shown in FIGURES 2 and 4, the holddown bars each have a plurality of collars 100 slidable thereon. A nut 102 supports each collar on the upper surface of the holding bars and a wing headed stud 104 extends through vertically aligned apertures 106 in the collar and is threadedly received by the nut 102.

To install the bricks 108 in position on the table top 50 for cutting, the bricks are arranged on the table top in a rectangular pattern as shown in FIGURE 2, and spaced from one another by means of spacers 110. The bricks 108 and spacers 110 are pushed tightly against the stationary fence 62, and then the adjustable fence 68 is secured to the stationary fence in the proper position by means of the slots 72 and stud 70. The bricks and spacers are then locked in position by means of the horizontal studs 82 extending through arms 78. The holddown bars 92 and 96 are then placed over the bricks in such a position as to provide space for the saw blade 12 to make the proper cut, and the holddown bars are then secured against the top of the bricks to hold them tightly against the table top by means of the post 86.

In order to make a plain angular or single miter vertical cut on the bricks, the nut 42 is loosened and the table top is rotated to the desired angle as indicated by scale 36 and indexing marks 60, and then the table top is locked in place by tightening down the nut 42 against the upper channel holder 46 so as to clamp the arcuate supports 54 and 52 in position. If it is desired to make a compound angular cut or a double miter cut, the table top is rocked about its horizontal axis on the arcuate supports 52 and 54 as indicated in FIGURE 1. The angle of rotation about the horizontal axis is indicated by the scale 58 and indexing mark 61 as shown in FIGURE 1. The table top is then rotated about its vertical axis or center post 40 to the desired angle as indicated by scale 36 and indicating mark 60. After the two angular adjustments are made, they are both set by tightening the nut 42 on center post 40.

To cut the bricks 108, the motor rotating blade 12 is energized and the dolly cart 10 is pushed in a horizontal direction parallel to the blade 12 so as to force it into the bricks for cutting the same. The elevation of the blade 12 may be controlled by a foot pedal, not shown. Downward pressure on the foot pedal lowers the saw blade, and release of pressure on the foot pedal causes the blade to rise. To cut the bricks, the foot pedal is depressed so as to force the saw blade into the bricks until the edge of the blade is almost contacting the table top 50, and then the dolly cart 10 is pushed so as to force the blade through the bricks. If the table top 50 is tilted such as shown in FIGURE 1, then the blade 12 is gradually raised as it proceeds through the bricks so as to prevent it from cutting into the table top.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A miter table for masonry saws comprising a main base member, a flat table top member spaced from said base member for supporting masonry to be cut, adjusting means connecting said top member to said base member, said means permitting said top member to be tilted with respect to said base member and permitting said top member to be rotated about an axis normal to one of said members, a single locking means for locking said adjusting means whereby said top member may be instantly locked simultaneously in a preselected tilt position and a preselected angular position about said axis with respect to said base member, a stationary fence secured to one edge of said top and extending therefrom, an adjustable fence normal to said stationary fence and adjustably secured thereto and means for rigidly securing said masonry upon said table top including a rod member fixed to the bottom of said table top and a pair of adjustable clamping means slidably mounted upon each end of said rod and extending above said table top for clamping said masonry therebetween.

2. A miter table for masonry saws comprising a main base member, a flat table top member spaced from said base member for supporting masonry to be cut, adjusting means connecting said top member to said base member, said means permitting said top member to be tilted with respect to said base member and permitting said top member to be rotated about an axis normal to one of said members, a single locking means for locking said adjusting means whereby said top member may be instantly locked simultaneously in a preselected tilt position and a preselected angular position about said axis with respect to said base member, said adjusting means including arcuate supports connected to one of said members, releasable clamping means having jaws receiving said supports, tightening means on said clamping means for releasably forcing said jaws into engagement with said supports, a stationary fence secured to one edge of said top and extending therefrom, an adjustable fence normal to said stationary fence and adjustably secured thereto and means for rigidly securing said masonry upon said table top including a rod member fixed to the bottom of said table top and a pair of adjustable clamping means slidably mounted upon each end of said rod and extending above said table top for clamping said masonry therebetween.

3. A miter table as defined in claim 2 wherein said table top has adjustable hold down means adjustably secured thereto for holding down masonry thereon, said hold down means including spaced posts each having one of their ends secured to said top, the other ends of said posts adjustably connected to a hold down bar extending generally parallel to said top and spaced therefrom by said posts.

4. A miter table as defined in claim 3 wherein collar means are slidably connected for longitudinal movement on said hold down bar, said collar means including masonry clamping means adjustably connected thereto and projecting from said hold down bar towards said top.

References Cited in the file of this patent

UNITED STATES PATENTS

| | | |
|---|---|---|
| 720,912 | Gorton | Feb. 17, 1903 |
| 1,155,987 | Beckett | Oct. 5, 1915 |
| 1,434,131 | Lutz | Oct. 31, 1922 |
| 2,107,566 | Gardner | Feb. 8, 1938 |
| 2,383,829 | Thompson | Aug. 28, 1945 |
| 2,432,056 | Wiken et al. | Dec. 2, 1947 |
| 2,444,727 | Bush | July 6, 1948 |
| 2,695,015 | Cooper | Nov. 23, 1954 |

FOREIGN PATENTS

| | | |
|---|---|---|
| 1524/1866 | Great Britain | May 31, 1866 |